United States Patent [19]

Noda

[11] Patent Number: 4,482,105
[45] Date of Patent: Nov. 13, 1984

[54] FISHING REEL

[75] Inventor: Hideo Noda, Sakai, Japan

[73] Assignee: Shimano Industrial Company Limited, Osaka, Japan

[21] Appl. No.: 445,508

[22] Filed: Nov. 30, 1982

Related U.S. Application Data

[63] Continuation of Ser. No. 229,268, Jan. 28, 1981, abandoned.

[30] Foreign Application Priority Data

Jan. 31, 1980 [JP] Japan .................................. 55-12221

[51] Int. Cl.$^3$ .................................................. A01K 89/02
[52] U.S. Cl. .................................... 242/212; 242/219
[58] Field of Search ............ 242/217, 218, 219, 211, 242/212, 213, 214, 215, 216

[56] References Cited

U.S. PATENT DOCUMENTS

| | | |
|---|---|---|
| 2,129,386 | 9/1938 | Schafer . |
| 2,298,481 | 10/1942 | Hayes .................................. 242/219 |
| 2,354,530 | 7/1944 | McMahon . |
| 2,646,939 | 7/1953 | Hirsch .................................. 242/219 |
| 2,760,357 | 8/1956 | Burns .................................. 242/219 |
| 3,198,457 | 8/1965 | Holahan .............................. 242/217 |

Primary Examiner—Billy S. Taylor
Attorney, Agent, or Firm—Stevens, Davis, Miller & Mosher

[57] ABSTRACT

A fishing reel which is so constructed that a spool shaft having a spool is journalled to a frame having first and second side plates opposite to each other at a regular interval, and a support shaft fixed to the first side plate supports a drive mechanism comprising a tubular shaft, main gear, drag mechanism and handle bar, so that the drive mechanism is driven to rotate the spool shaft. The tubular shaft rotatably supports a cylinder, which perforates at its axially outer end through an outer plate attached to the first side plate outwardly thereof, extends outwardly therefrom, and has at the axially inner portion an end plate, the cylinder being provided at its outer periphery with the main gear and housing a plurality of friction plates constituting the drag mechanism, the outer plate having an insertion bore larger enough to insert therethrough the cylinder, the support shaft being provided with a stopper to restrain the drive mechanism from moving axially outwardly with respect to the support shaft, so that the stopper is removed therefrom to make it possible to remove the drive mechanism from the frame without removing the outer plate therefrom.

8 Claims, 5 Drawing Figures

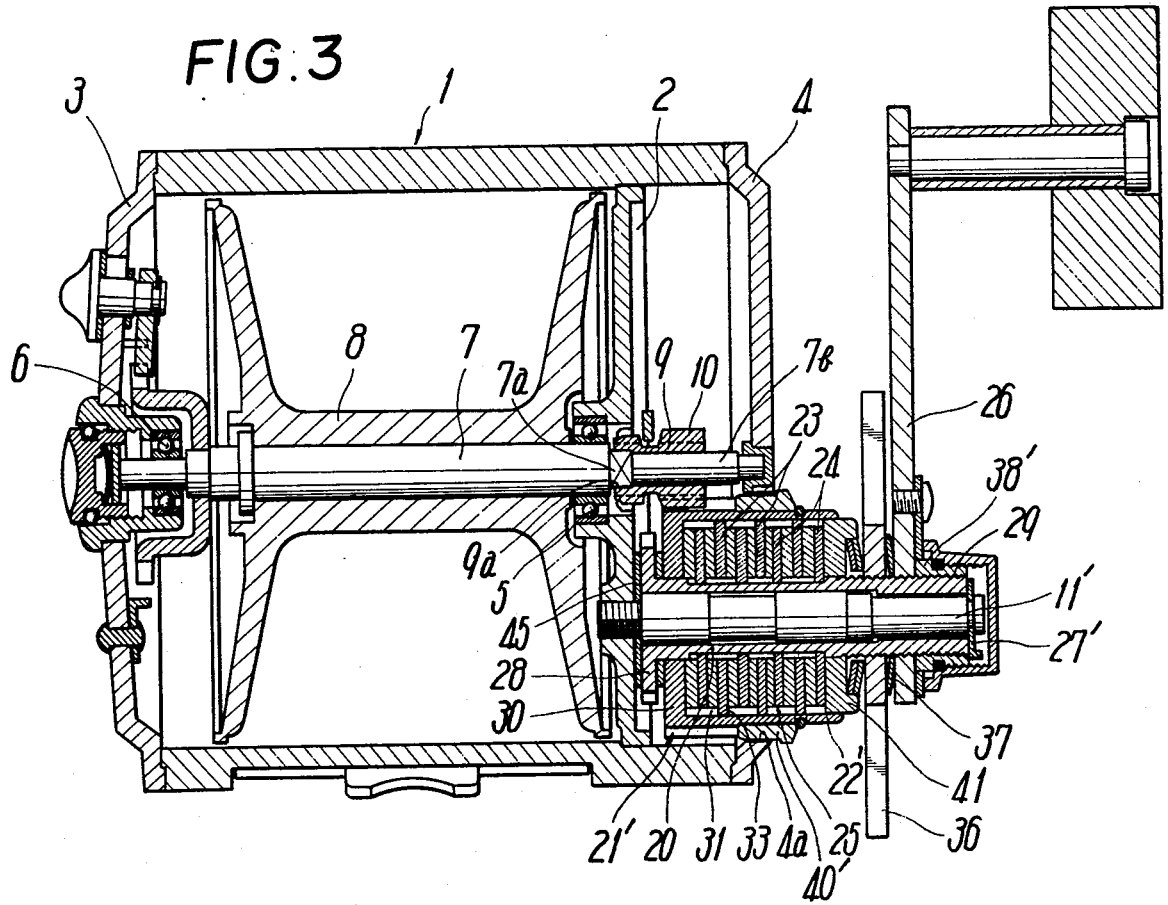

FISHING REEL

This is a continuation of application Ser. No. 229,268 filed Jan. 28, 1981, now abandoned.

FIELD OF THE INVENTION

This invention relates to a fishing reel, and more particularly to a fishing reel which is so constructed that a spool shaft having a spool is journalled to a frame comprising first and second side plates opposite to each other at a regular interval and an outer plate outside the first side plate. The first side plate supports a drive mechanism which rotates the spool shaft to thereby wind a fishing reel onto the spool.

BACKGROUND OF THE INVENTION

Generally, the drive mechanism of the fishing reel constructed according to the foregoing, comprises a tubular handle shaft having a handle bar and being rotatably supported between a first side plate and an outer plate provided outwardly thereof. A main gear having a short tubular portion and supported rotatably to the handle shaft is provided along with friction plates for a drag mechanism incorporated in the tubular portion of the main gear. An adjusting thumb nut for the drag mechanism is screwed with the end portion of the handle shaft projecting from the outer plate, and a collar is interposed between the thumb nut and the outermost friction plate and extends through the outer plate.

The tubular portion of the main gear is restricted in its axial length because it is housed in a space between the first side plate and the outer plate, whereby the number of friction plates in use is limited to create a problem of restricting an adjusting range of the thumb nut. A further problem is created in that replacement of each friction plate takes time due to the fact that the friction plates cannot be replaced without removing the outer plate from the first side plate.

The former problem is solved by expanding the space between the first side plate and the outer plate to accommodate an increased number of friction plates, but a larger space makes the reel larger in size, resulting in an increase in weight and a high manufacturing cost. Therefore, that solution is not adequate.

SUMMARY OF THE INVENTION

A main object of the invention is to provide a fishing reel which can increase the number of friction plates for a drag mechanism while the interval between a first side plate of a frame and an outer plate provided outside the first side plate is restricted to a minimum, and permits replacement of the friction plates without removing the outer plate from the frame. Another object of the invention is to provide a fishing reel which is capable of mounting and removing the drive mechanism integrally comprising a main gear, drag mechanism and handle lever, on and from the frame without being dismantled, thereby facilitating maintenance or check of the main gear as well as the replacement of friction plates.

A further object of the invention is to provide a fishing reel which can easily incorporate the drive mechanism in the frame even when the frame is provided with an anti-reverse-rotation pawl and the drive mechanism with an anti-reverse-rotation gear.

This invention is directed to an improvement in a fishing reel which is so constructed that a spool shaft having a spool is journalled to a frame including a pair of first and second side plates opposite to each other at a regular interval. A drive mechanism comprising a tubular shaft, main gear, drag mechanism and handle lever, is supported to a support shaft fixed to the first side plate, thereby driving the spool shaft, thus achieving the above objects.

In detail, the tubular shaft rotatably supports a cylinder which has at its axially inner end an end plate and extends at the axially outer end through an outer plate provided outside the first side plate and further extends axially outwardly from the outer plate. The cylinder carries at its outer periphery the main gear and houses a plurality of friction plates constituting the drag mechanism, the outer plate is provided with an insertion bore large enough to insert the cylinder. The support shaft is provided with a stopper means, such as a bolt or snap ring, for restraining the drive mechanism from moving axially outwardly with respect to the support shaft, so that the stopper means is removed from the support shaft to thereby remove the drive mechanism from the frame without removing the outer plate therefrom.

The cylinder, which extends through the outer plate to extend axially outwardly therefrom, is large enough in axial length to accomodate the friction plates, so that there is no need of enlarging the space between the first side plate and the outer plate. Hence, by increasing the number of the friction plates the adjusting range of the drag mechanism is increased, thereby enabling the drag mechanism to produce a proper sliding resistance corresponding to the load of a hooked fish. The drive mechanism, which is removable from the frame by operating the stopper means without removing the outer plate, facilitates an replacement of the friction plate as well as the maintenance and check of the main gear.

The provision of a flange at the outer periphery of an axially inner end of the tubular shaft can set the drive mechanism in a unit of the cylinder, drag mechanism and handle lever, around the tubular shaft. Hence, the unit drive mechanism is freely mountable on and removable from the support shaft without being dismantled, thereby more readily carrying out replacement of the friction plate maintaining the main gear.

Furthermore, the end plate of the cylinder has a central bore with a diameter approximately equal to an outer diameter of the tubular shaft so that the cylinder is journalled at its axially inner end to the tubular shaft through the end plate. A first bearing member is provided at the outer periphery of the axially outer portion of the cylinder so that the cylinder is journalled at the axially outer portion to the insertion bore of the outer plate. Alternatively, a second bearing member is provided at the inner periphery of an axially outer end of the cylinder so that the cylinder is journalled at its axial end to the tubular shaft, thereby making it possible to journal the cylinder to the tubular shaft in a stable manner.

Even when an anti-reverse-rotation pawl for preventing reverse rotation of the drive mechanism is provided at the first side plate of the frame and an anti-reverse-rotation gear is at the tubular shaft, the first side plate is provided with retaining means for retaining the pawl at the position substantially equal or smaller in radial distance to a radius of the dedendum circle of the gear. One of the anti-reverse-rotation pawl and anti-reverse-rotation gear is provided with an engaging projection directed to the other, so that the drive mechanism is easily mounted on the frame without any interference between the pawl and the gear.

BRIEF DESCRIPTION OF THE DRAWINGS

FIG. 3 is a sectional front view of a modified embodiment of the invention, FIG. 4 is a partially enlarged sectional view showing the process of incorporating a drive mechanism with a frame, and FIG. 5 is a sectional view taken on the line V—V in FIG. 4.

DETAILED DESCRIPTION OF THE INVENTION

Figures 1, 2:
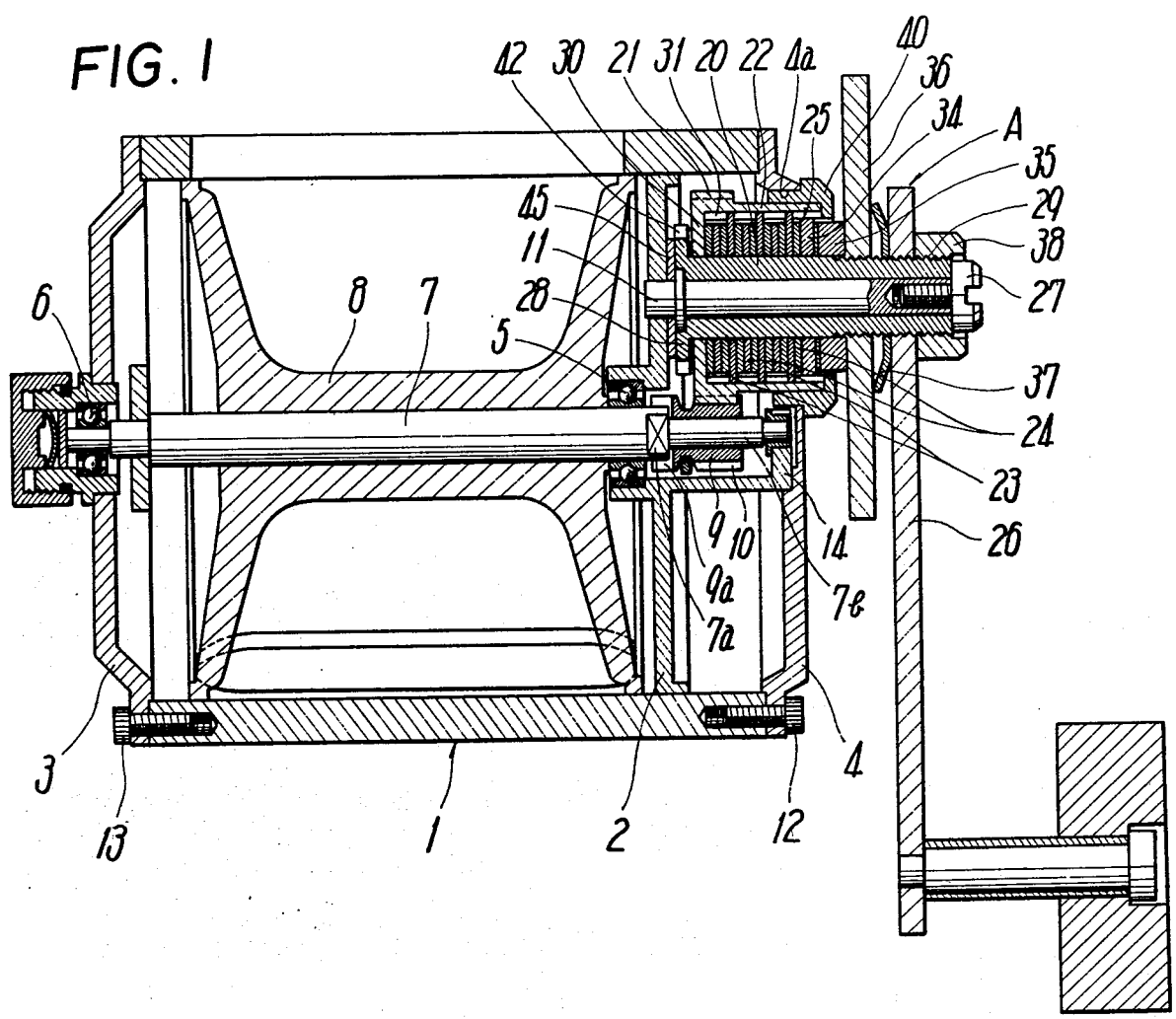
FIG. 1 is a sectional plan view of a typical embodiment of a fishing reel of the invention.
FIG. 2 is a sectional side view of the FIG. 1 embodiment, in which an outer plate and a second bearing member are removed.

The basic construction of a fishing reel utilizing the invention is well-known. The fishing reel, as shown in FIGS. 1 and 2, comprises; a frame 1 having first and second side plates 2 and 3 opposite to each other at a regular interval. An outer plate 4 is positioned outwardly of the first side plate 2. A spool shaft 7 is journalled to the side plates 2 and 3 through bearings 5 and 6 and has an engaging portion 7a non-circular in section and an extending shaft portion 7b extending through the first side plate 2 to extend outwardly therefrom. A spool 8 is disposed between both side plates 2 and 3 and is rotatable together with the spool shaft 7. A pinion shaft 9 which is sleeved onto the extending shaft portion 7b, has a pinion 9 and an engageable portion 9a having the inner surface non-circular in section, and is slidable between the position where the engageable portion 9a engages with the engaging portion 7a and the position where the engageable portion 9a disengages from the engaging portion 7a. A support shaft 11 is fixed to the first side plate 2 and extends through the outer plate 4 to extend outwardly therefrom. A drive mechanism A is supported to the support shaft 11 so as to drive the pinion shaft 9.

In the above construction, the pinion shaft 9 is kept in the aforesaid engaging position and the drive mechanism A is driven to rotate the pinion shaft 9 and spool shaft 7 whereby the spool 8 rotates to wind thereon a fishing line. On the other hand, the pinion shaft 9 is kept in the aforesaid disengaging position to thereby make the spool 8 freely rotatable together with the spool shaft 7, thus permitting casing of the line.

In the above construction, the first and second side plates 2 and 3 and outer plate 4 are integrally fixed by use of tightening bolts 12 and 13, thereby forming the frame 1. Alternatively, the first and second side plates 2 and 3 may be connected by separate connecting rods and the outer plate 4 of a box-like shape may be fixed to the first side plate 2 outwardly thereof.

The extending shaft portion 7b at the spool shaft 7 is supported at the utmost end to a support arm 14 extending from the first side plate 2 toward the outer plate 4, but alternatively may be supported as shown in FIG. 3.

A clutch lever 15, as shown in FIG. 2, is operated to move the pinion shaft 9. At the first side plate 2, the clutch lever 15 is pivoted and a clutch yoke 16 engageable therewith is supported to be slidable radially of the pinion shaft 9. A holder 17 holding the pinion shaft 9 at its intermediate portion is movable axially of the pinion shaft 9, so that the clutch yoke 16 slides to engage with the holder 17 and move the holder 17 axially of the pinion shaft 9, whereby the pinion shaft 9 axially moves together with the holder 17.

The aforesaid construction is not important to the invention, which is basically similar to the generally well-known fishing reel. Accordingly, the details of construction and function of the fishing reel used with the invention have been omitted for simplifying the description, but this construction and function will be easily understood by those skilled in the art.

The present invention is directed to the following improvement in the drive mechanism A at the fishing reel constructed as foregoing.

The drive mechanism A comprises; a tubular shaft 20 supported rotatably to the support shaft 11; a cylinder 22 which is rotatably supported to the tubular shaft 20, and has at the outer periphery a main gear 21 in mesh with the pinion 10, and extends at the axially outer end through the outer plate 4; a drag mechanism 25 having a plurality of friction plates 23 and 24 housed within the cylinder 22; and a handle bar 26 supported to the axially outer end of tubular shaft 20. A through bore 4a large enough to insert the cylinder 22 is provided at the outer plate 4. A stopper means 27, such as a bolt or stopper, is provided at the support shaft 11 to thereby restrain the drive mechanism A from moving axially outwardly with respect to the support shaft 11. The stopper means is removed from the support shaft 11 to allow the drive mechanism A to be removed from the frame 1 without removing the outer plate 4 therefrom.

In greater detail, the tubular shaft 20 is about equal in length to the support shaft 11, and is provided at the outer periphery of the axially inner end with a flange 28 which receives the cylinder 22 in a relationship relatively movable, and the outer periphery of the axially outer end portion includes a screw thread 29. The cylinder 22 is provided at the inner periphery of the axially inner end with a disc-like shaped end plate 30 having a central bore, and at the inner periphery with recesses 31 positioned diametrically opposite cylinder 22 and extending axially thereof. The tubular shaft 20 is provided at the outer periphery thereof with flat faces 32 positioned diametrically opposite each other and extending axially of the tubular shaft 20. The plurality of friction plates 23 are provided at the outer peripheries thereof with projections 33 engageable with the recesses 31 and have round center bores respectively, thereby rotating integrally with the cylinder 22. The plurality of other friction plates 24 are round at the outer periphery and have central non-circular bores to engage with the flat faces 32 at the tubular shaft 20 respectively, thereby rotating integrally with the tubular shaft 20.

The drag mechanism 25 comprises the friction plates 23 and 24, a biasing member 34 supported only slidably to the tubular shaft 20, and an adjusting thumb nut 36 screwed with a screw thread 29 at the tubular shaft 20 through a collar 35. The thumb nut 36 is rotated to adjust a biasing force applied to the end plate 30 of cylinder 22 through the collar 35 and biasing member 34.

The drag mechanism 25 functions to transmit a driving force from the tubular shaft 20 rotated by the handle bar 26 to the cylinder 22 by use of friction caused between the plurality of friction plates 23 and 24, so that the driving force is transmitted to the spool shaft 7 by way of the main gear 21 and pinion 10 to thereby wind the fishing line onto the spool 8. If a load over a given range is applied to the line when wound onto the spool 8, the plurality of friction plates 23 and 24 slide to put the spool 8 in lost motion to thereby avoid overloading on the line.

The function of drag mechanism 25 is similar to the conventional one. The adjustment by thumb nut 36 can set a load to a desired value for starting the sliding of friction plates 23 and 24.

The handle bar 26 is fitted onto the tubular shaft 20 outwardly from the thumb nut 36 through a spring washer 37 and tightened by a nut 38 screwed with the screw thread 29, thus revolving together with the tubular shaft 20 through a non-circular insertion bore at the handle bar 26 to mate with the flat faces 32 of tubular shaft 20.

Alternatively, the handle bar 26 may be fitted onto the tubular shaft 20 axially inwardly of the thumb nut 36 and mounted by a screw thread, in which case the nut 38 can be omitted.

In the aforesaid construction, the cylinder 22, friction plates 23 and 24, biasing member 34, and collar 35, are assembled around the tubular shaft 20 through the adjusting thumb nut 36 and handle bar 26 which are screwed with the tubular shaft 20, so that cylinder 22, drag mechanism 25 and handle bar 26, forms a unit drive mechanism A. Therefore, the unit drive mechanism A can be mounted on and removed from the support shaft 11 through an insertion bore 4a of outer plate 4 without being dismantled.

In other words, the drive mechanism A can be mounted or removed only by the simple operation of attaching or removing the stopper means 27, so that it is possible to quickly replace the friction plates 23 and 24, and carry out maintenance or check the main gear 21 at the cylinder 22, without removing the outer plate 4.

The cylinder 22, which extends at the axially outer portion thereof through the outer plate 4 outwardly therefrom, can accommodate a number of friction plates to enlarge the frictional contact area and increase the adjusting range of friction plates, thereby setting a load, accurately and in a stable condition, to start the sliding of the friction plates 23 and 24.

The cylinder 22 in the above construction, which is supported to the tubular shaft 20 carrying the friction plates 23 through the central bores thereof, can be more stably supported by the end plate 30 which has a central bore of a diameter about equal to the outer diameter of tubular shaft 20 and serves as a bearing member. A cylindrical first bearing 40 is mounted on the outer periphery of an axially outer portion of cylinder 22 and fitted into insertion bore 4a at the outer plate 4, so that the cylinder 22 can be journalled to the outer plates 4 to be more stably supported thereto.

A second bearing 41 having a round central bore, as shown in FIG. 3, is provided at the inner periphery of the axially outer end of cylinder 22 and is substituted for the biasing member 34 at drag mechanism 25 in FIG. 1, so that the central bore is fitted onto the tubular shaft 20, thereby journalling thereto the cylinder 22 at the axially outer end thereof.

Therefore, the cylinder 22 is more stably supported to the tubular shaft 20 through the end plate 30 and second bearing 41 and also to the outer plate 4 through the first bearing 40. Other elements in FIG. 3 function the same as like structures in FIG. 1, however their configuration may be slightly different as indicated by the prime symbol (′) on their FIG. 3 legends.

In the aforesaid embodiment, in order to prevent anti-reverse-rotation of handle bar 26, an anti-reverse-rotation gear 42 having ratchet teeth, as shown in FIG. 2, is provided at the flange 28 of tubular shaft 20, and an anti-reverse-rotation pawl 43 in mesh with the gear 42 is pivoted at the first side plate 2, the pawl 43 being biased by a spring 44 in the direction of meshing with the gear 42.

In this instance, when the drive mechanism A is incorporated in the frame 1, the tip of anti-reverse-rotation pawl 43 supported to the first side plate 2 is biased by the spring 44 and positioned at a side of the axis of support shaft 11 so as to strike the anti-reverse-rotation gear 42 at the flange 28 of tubular shaft 20. This makes it impossible to assemble the drive mechanism A in condition for engaging the pawl 43 with the gear 42. In order to overcome this problem, a retaining means, as shown in FIG. 1, comprising a disc-like shaped spacer 45 having an outer diameter about equal to a diameter of the dedendum circle of gear 42, is mounted on the first side plate 2 and around the support shaft 11.

The spacer 45 keeps on its outer periphery the tip of anti-reverse-rotation pawl 43 prior to an assembly of the drive mechanism A so that the tip is restrained from swinging toward the axis of support shaft 11 beyond the dedendum circle of anti-reverse-rotation gear 42. Hence, even when a tooth of the gear 42 at the utmost end of tubular shaft 20 contacts with the tip of pawl 43 during the assembly of drive mechanism A, the tubular shaft 20 is rotated a little to allow the pawl 43 to simply mesh with the gear 42.

In addition, the aforesaid spacer 45 is made smaller in thickness than the pawl 43.

The pawl 43 for preventing the reverse rotation of tubular shaft 20, during normal rotation becomes free and taps the bottom land of each tooth at the gear 42 rotating with the tubular shaft 20. Therefore, the bottom land, after long use, is deformed leading to padding, which enters between the gear 42 and the spacer 45 equal in diameter to the dedendum circle of gear 42, thereby thrusting the tubular shaft 20 axially outwardly. As a result, a variance is caused in the set value of the load adjusted by the thumb nut 36 to start the sliding of the friction plates. Such a defect is sufficiently eliminated by increasing the hardness of tubular shaft 20, which however leads to a high manufacturing cost.

Therefore, the outer diameter of spacer 45 is made smaller than the diameter of the dedendum circle of gear 42 and one of the gear 42 and pawl 43 is provided with a projection 46 directed toward the other, thereby solving the above problem.

Such a construction is shown in FIGS. 4 and 5, in which the pawl 43 is provided at the tip thereof with the projection 46 extending toward the gear 42.

In addition, the projection 46 is positioned between the dedendum circle of the gear 42 and the addendum circle thereof in condition for retaining the tip of pawl 43 on the outer periphery of spacer 45.

In the above construction, the pawl 43, as shown by the solid line in FIG. 5, is held at the tip by the spacer 45 prior to an assembly of drive mechanism A. In this condition, when the drive mechanism A is assembled, the gear 42, as shown in FIG. 4, contacts with the tip of pawl 43 to place the projection 46 between adjacent teeth of gear 42.

In addition, in the above assembly of drive mechanism A, the projection 46 occasionally contacts with a tooth at the gear 42. In this instance, the tubular shaft 20 is slightly rotated to place the projection 46 between the adjacent teeth of gear 42.

Under this condition, the tubular shaft 20 is rotated a little to push the projection 46 radially outwardly of gear 42 through a slant face of the tooth thereof, so that the pawl 43 swings to place its tip beyond the dedendum circle of gear 42 as shown by the one-dot-and-dash line in FIG. 5. Hence, the tubular shaft 20 is permitted to move axially inwardly to thereby enable the pawl 43 to mesh with the gear 42.

Alternatively, the projection 46 may be provided at the gear 42.

Also, the retaining means for the pawl 43 may employ a pin 47, instead of the spacer 45, as shown by the two-dots-and-dash lines in FIG. 5, the pin 47 being fixed to the first side plate 2.

Furthermore, the cylinder 22 alternatively may be axially divided into two portions, e.g., a main gear 21 carrying portion and a portion extending axially outwardly therefrom. These divided portions mesh with each other through ridges provided at the abutting face of each portion and are connected by a turning of adjusting thumb nut 36. Therefore, the cylinder 22 is made to facilitate machining of the main gear 21.

While preferred embodiments of the invention have been described using specific terms, such description for illustrative purposes only, and it is to be understood that changes and variations may be made without departing from the spirit or scope of the invention defined by following claims.

What is claimed is:

1. A fishing reel comprising: a frame having first and second side plates opposite to each other at a predetermined interval and an outer plate positioned outwardly of said first side plate; a spool shaft journalled to said side plates at said frame and having an extending shaft portion disposed between said first side plate and said outer plate; a spool disposed between said side plates and rotatable together with said spool shaft; a pinion shaft having a pinion, being positioned on said extending shaft portion at said spool shaft, and being slidable between a position where said pinion shaft engages with a portion of said spool shaft to thereby rotate therewith and a position where said pinion shaft disengages from said portion of said spool shaft to allow said spool shaft to rotate relative to said pinion shaft; a support shaft fixed to said first side plate and extending through an insertion bore in said outer plate to extend axially outwardly therefrom; a drive mechanism supported to said support shaft for driving said pinion shaft, said drive mechanism comprising a tubular shaft supported rotatably to said support shaft, a cylinder which is supported rotatably to said tubular shaft, having at the outer periphery thereof a main gear in mesh with said pinion, extending at the axially outer end through said insertion bore and outer plate so as to project beyond the outermost extend of said outer plate, and provided at the axially inner side with an end plate having a central bore, the largest diameter of said cylinder being smaller than the diameter of said insertion bore, said cylinder having at the outer periphery of its axially outer portion a first bearing member, said first bearing member being fitted into said insertion bore at said insertion bore at said outer plate, said cylinder being journalled at the axially outer portion thereof to said outer plate; a drag mechanism having a plurality of friction plates housed within said cylinder; and a handle supported to said tubular shaft; said support shaft having removable stopper means which is the sole mechanism for preventing said drive mechanism from moving axially outwardly with respect to said cover plate and support shaft, said drive mechanism being freely removable from said frame without removing said outer plate therefrom upon removal of said stopper means.

2. A fishing reel comprising: a frame having first and second side plates opposite to each other at a predetermined interval and an outer plate positioned outwardly of said first side plate; a spool shaft journalled to said side plates at said frame and having an extending shaft portion disposed between said first side plate and said outer plate; a spool disposed between said side plates and rotatable together with said spool shaft; a pinion shaft having a pinion, being positioned on said extending shaft portion at said spool shaft, and being slidable between a position where said pinion shaft engages with a portion of said spool shaft to thereby rotate therewith and a position where said pinion shaft disengages from said portion of said spool shaft to allow said spool shaft to rotate relative to said pinion shaft; a support shaft fixed to said first side plate and extending through an insertion bore in said outer plate to extend axially outwardly therefrom; a drive mechanism supported to said support shaft for driving said pinion shaft, said drive mechanism comprising a tubular shaft supported rotatably to said support shaft, a cylinder which is supported rotatably to said tubular shaft, having at the outer periphery therof a main gear in mesh with said pinion, extending at the axially outer end through said insertion bore and outer plate so as to project beyond the outermost extent of said outer plate, and provided at the axially inner side with an end plate having a central bore, the largest diameter of said cylinder being smaller than the diameter of said insertion bore to permit said cylinder to pass freely through said insertion bore; a drag mechanism having a plurality of friction plates housed within said cylinder; and a handle supported to said tubular shaft, said support shaft engaging with a single removable fixation member which is the sole mechanism for preventing said drive mechanism from moving axially outwardly with respect to said cover plate and support shaft, said drive mechanism being freely removable from said frame without removing said outer plate therefrom upon removal of said single fixation member.

3. A fishing reel according to claim 2, wherein said tubular shaft has at its outer periphery of an axially inner portion a flange for receiving said cylinder, and said cylinder, drag mechanism and handle, being formed in one unit around said tubular shaft, so that said unit drive mechanism is made integrally mountable and removable from said support shaft provided at said outer plate.

4. A fishing reel according to claim 2, wherein the central bore of said end plate of said cylinder has a diameter substantially equal to an outer diameter of said tubular shaft, said central bore being fitted onto said tubular shaft, said cylinder being journalled at the axially inner portion thereof to said tubular shaft.

5. A fishing reel according to claim 1, wherein on the inner periphery of the axially outer portion of said cylinder is mounted a second bearing member having a central bore and being disclike shaped, said second bearing member being fitted through its central bore onto said tubular shaft, so that said cylinder is journalled at the axially outer portion thereof to said tubular shaft.

6. A fishing reel according to claim 3, wherein ratchet teeth are formed at the outer periphery of said flange so as to provide an anti-reverse-rotation gear for preventing said handle from reversely rotating, said first side plate supporting an anti-reverse-rotation pawl biased in the direction of meshing with said teeth.

7. A fishing reel according to claim 6, wherein said first side plate has retaining means for retaining the tip of said anti-reverse-rotation pawl at a position substantially equal in radial distance to a radius of the dedendum circle of said anti-reverse-rotation gear.

8. A fishing reel according to claim 6, wherein said first side plate is provided with retaining means for retaining the tip of said anti-reverse-rotation pawl at a position radially inward of said anti-reverse-rotation gear from the dedendum circle thereof, and one of said anti-reverse-rotation pawl and anti-reverse-rotation gear, is provided with an engaging projection directed to the remaining one of said gear and pawl.

* * * * *